Sept. 10, 1963  D. A. CHURCH  3,103,326
BALLOON END FITTING
Filed June 21, 1961
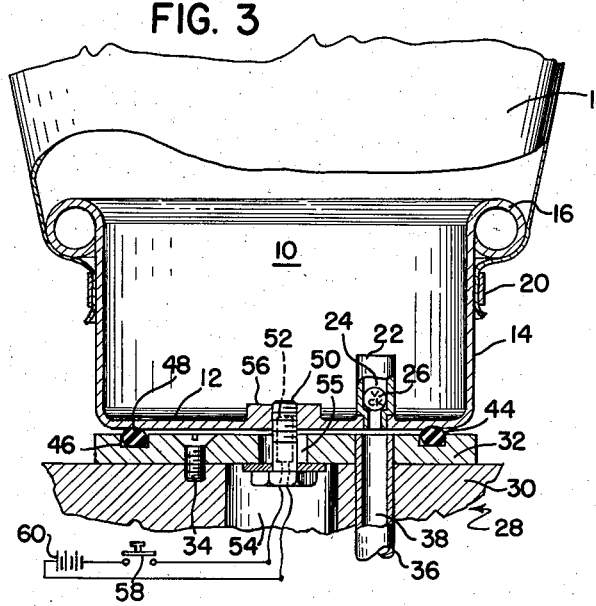
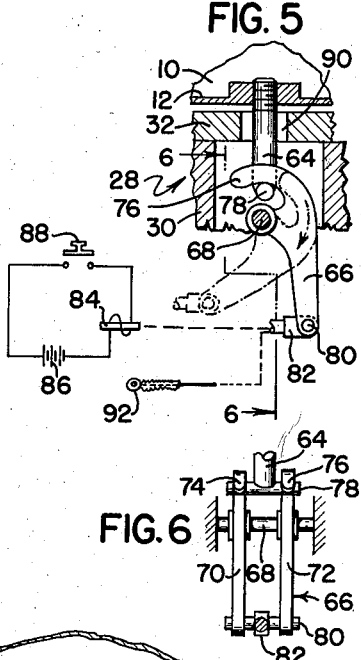
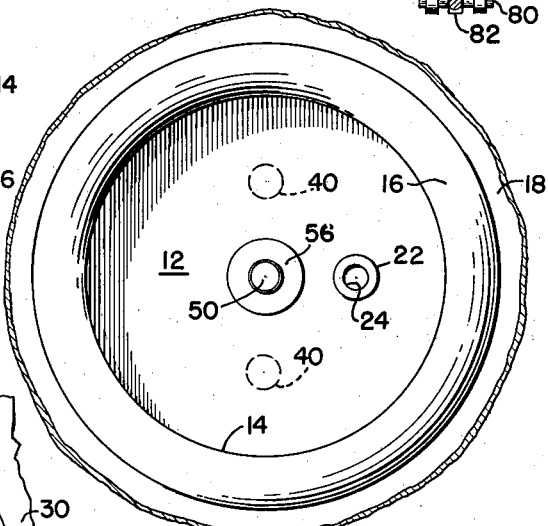
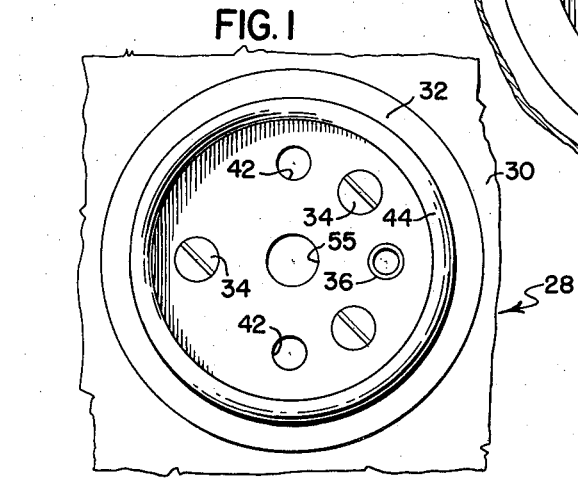
*INVENTOR.*
DAVID A. CHURCH
BY Allen M. Sutton
ATTORNEY

United States Patent Office 3,103,326
Patented Sept. 10, 1963

3,103,326
BALLOON END FITTING
David A. Church, Coon Rapids, Minn., assignor to General Mills, Inc., a corporation of Delaware
Filed June 21, 1961, Ser. No. 118,734
4 Claims. (Cl. 244—31)

The present invention relates generally to balloons, and more specifically to an improved end fitting for balloons.

In recent years balloons have had numerous applications. For example, they are useful in meteorology for determining various weather conditions, and balloons are now playing an important part in the exploration of the earth's atmosphere.

Although balloons of various sizes and shapes are known in the art, one form that has received popular acceptance is one constructed of tubular plastic or other light-weight material. The tubular material is cut to a desired length and its ends are closed off to complete the balloon. The balloon is then inflated with a sufficient amount of lifting gas to carry it aloft to a predetermined altitude. In balloons of that type, it is customary to seal or close off the ends of the balloon with mechanical end fittings. Existing types of end fittings, however, have certain disadvantages which point out a need for an improved fitting such as is provided by the present invention. For example, one known problem has been to maintain the balloon in a stable condition during its inflation. Another difficulty which exists in some instances is that of keeping the balloon material away from the high pressure flow of gas during inflation so that a rupture in the balloon surface does not occur. A further problem encountered in existing end fittings is that of simultaneously releasing the inflating means and the balloon from a hold-down structure during the launching operation.

Accordingly, it is an object of the present invention to provide an improved end fitting for balloons wherein the end fitting is utilized to stabilize and maintain the balloon in position during inflation.

Another object of the invention is to provide an end fitting for a balloon wherein an inflating gas enters the balloon in an area surrounded by the end fitting, and is not injected directly against the walls of the balloon.

A further object of the invention is to provide an improved end fitting for a balloon wherein the hold-down means and the inflating means are rapidly and substantially simultaneously released during the launching operation.

The foregoing objects are attained in the present invention by providing an end fitting comprising a cup-shaped end closure member for the balloon and a base structure to which the end closure member may be coupled. Gas entry coupling means extend through the base structure and into the end closure member. Rapidly separable mechanical means are provided to couple the base structure and the end closure member together during the balloon filling operation and substantially simultaneously separate the gas coupling means and the base structure and end closure member when it is desired to launch the balloon.

Other objects and advantages of the invention will become apparent from the following description, taken in conjunction with the accompanying drawing, in which:

FIGURES 1 and 2 are plan views of a base structure and an end closure member, respectively, constructed in accordance with the invention;

FIG. 3 is a vertical sectional view showing the end closure member coupled to the base structure during the filling operation;

FIG. 4 is a view similar to FIG. 3 showing the end closure member and the base structure just after they have been separated;

FIG. 5 is a fragmentary sectional view of an embodiment of the invention utilizing another type of mechanical release means; and FIG. 6 is a sectional view taken generally along, and in the direction of, the line 6—6 of FIG. 5.

The embodiment of the invention shown in FIGS. 1 through 4 includes a cup-shaped end closure member 10 having a generally flat bottom 12 surrounded by an upstanding side wall 14, which terminates in an annular mounting ring or flange 16. A balloon 18 is secured to the end closure member 10 in any suitable manner, as, for example, by means of a banding ring 20 located below the flange 16. A gas inlet tube 22 is secured to the bottom 12 of the end closure member with a bore 24 extending through both members, and, if desired, a conventional check valve 26 may be provided within the bore 24. The inlet tube 22 may be made integrally with the end closure member 10 or may be attached to its bottom 12 by conventional means.

The end closure member is adapted to be coupled to a base structure shown generally at 28, which comprises a base plate 30 and a mounting ring or plate 32 secured to the base plate by means of screws 34. The base structure 28 is provided with a gas entry tube 36 having a bore 38 that is maintained in alignment with the bore 24 of gas inlet tube 22 by one or more locating pins 40 carried by the end closure member 10, which fit into apertures 42 in the mounting plate 32. The tubes 22 and 36 provide gas entry coupling means for introducing a filling gas into the balloon 18. It is pointed out that the gas inlet tube 22 terminates considerably below the top of the end closure member 10. Thus, the filling gas has an opportunity to diffuse before it contacts the thin walls of the balloon.

Sealing means between the bottom of the end closure member 10 and the top of the mounting plate 32 are provided by a resilient O ring 44 seated in an annular groove 46 provided in the top of the mounting plate 32. When the end closure member 10 is coupled to the base structure, as will be explained hereafter, the O ring 44 is compressed and forms a gas-tight seal. An annular depression or shallow groove 48 may be formed in the bottom 12 of the end closure member to aid in seating the ring 44.

The end closure member 10 is coupled to the base structure 28 by means of an explosive bolt 50 having a charge 52 therein. The head of the bolt 50, provided with a washer if desired, is located in a bore 54 in the base plate 30 and bears against the underside of the mounting plate 32. The shaft of the bolt 50 extends through a clearance hole 55 in the plate 32 and is threaded into a boss 56 formed on the bottom 12 of the end closure member. As the bolt 50 is tightened down, the end closure member 10 is coupled to the base structure 28 with a gas-tight seal therebetween provided by the O ring 44.

Explosive bolts, such as the bolt 50, are well known in the art and are manufactured and sold commercially by the Conax Corporation, Buffalo, New York, and by Holex, Inc., Hollister, California.

The explosive charge 52 within the bolt 50 is connected through a normally open switch 58 to a battery 60 or other suitable source of potential. Thus, when the switch 58 is closed, the charge 52 is detonated, causing the bolt 50 to be severed in the area between the mounting plate 32 and the bottom 12 of the end closure member. This is best seen in FIG. 4 where the explosive bolt 50 has been severed by the detonation of the charge 52 resulting from closing the switch 58. The balloon having been previously filled with the proper amount of gas, it rapidly lifts the end closure member 10 away from the sealing ring 44 and the base structure 28.

It can thus be seen that upon severing the bolt 50 a quick disconnect is accomplished between the end closure member 10 and the base structure 28. The simultaneous release of the end closure member 10 and the gas entry coupling (tubes 22 and 36) of the balloon provides an improved end fitting which attains the stated objectives, is simple in construction, and fills a need in the art.

FIGS. 5 and 6 illustrate an embodiment of the invention utilizing another form of release means. In that embodiment, the hold-down bolt 50 (FIG. 3) has been replaced by a T-bar 64 which maintains the bottom 12 of the end closure member 10 in a clamped relationship with the mounting plate 32. The T-bar 64 is held in such relationship by mechanical means in the form of a cam clamp 66 that is pivotal about a cross pin 68 in the base plate 30. The cam clamp 66 includes arms 70 and 72 which are laterally spaced apart and which are provided with curved gripping fingers 74 and 76 that extend around the lower end of the cross member 78 of the T-bar 64. Thus a clamping relationship is maintained between the bottom 12 of the end closure member and the base structure 28. The cam clamp 66 is provided in its lower end with a pivot pin 80 to which is secured a clevis 82 suitably attached to a solenoid 84 which may be energized by a battery 86 through a normally open switch 88. Thus, when the switch 88 is closed, solenoid 84 is energized and cam clamp 66 is rotated about the pivot 68 to the position shown in broken lines to free the T-bar 64. A suitable opening 90 in the mounting plate 32 provides clearance for the release of the cross member 78 of the T-bar 64. Thus, the cam clamp 66, upon being rotated, releases the end closure member 10 and the balloon rises as previously described. While it is not shown in the drawings, it will be realized that the sealing means previously described may be employed in the embodiment shown in FIGS. 5 and 6. In addition, a pull or rip cord 92 may be provided as an alternate release means so that the clevis 82 can be manually retracted to release the T-bar 64.

Although two embodiments of the invention have been described, it will be apparent that many modifications may be made by one skilled in the art without departing from the spirit of the invention.

I claim:

1. An end fitting for a balloon comprising a base plate having an inflation tube, a cup-shaped end closure member for attachment to the balloon and adapted to be coupled to said base plate, said end closure member having an inflation valve secured to its bottom and a locating pin for fitting into an aperture in said base plate to align said inflation tube and inflation valve, an annular groove in said base plate circumscribing said inflation tube, a sealing ring in said annular groove, and an explosive bolt for coupling said end closure member to said base plate, whereby said end closure means and said base plate are rapidly separated when said explosive bolt is exploded.

2. An end fitting for a ballon comprising a mounting surface, a gas entry means in communication with said mounting surface, a balloon end closure member for attachment to the balloon provided with a surface in the bottom thereof adjacent said mounting surface and which conforms with said mounting surface, an inflation valve secured to said bottom in said gas entry means, and rigid rapidly separable coupling means for securing said end closure member to said mounting surface, whereby upon separation of said coupling means, said end closure means and said mounting surface are rapidly separated.

3. The device of claim 2 in which an air tight sealing means is provided which circumscribes the portion of said gas entry means positioned between said mounting surface and said enclosure member.

4. The device of claim 3 in which said coupling means is a single explosive member, which when exploded frees the balloon end closure from said mounting surface and separates the air tight seal simultaneously.

References Cited in the file of this patent

UNITED STATES PATENTS

| | | |
|---|---|---|
| 1,672,163 | Krammer | June 5, 1928 |
| 2,570,549 | Hansell | Oct. 9, 1951 |
| 3,017,907 | Quail et al. | Jan. 23, 1962 |